United States Patent [19]

Hartmann et al.

[11] 4,394,270
[45] Jul. 19, 1983

[54] APPARATUS FOR THE CHEMICAL CONDITIONING OF SLUDGES

[75] Inventors: Achim Hartmann, Pulheim; Dieter Schinkitz, Leverkusen, both of Fed. Rep. of Germany

[73] Assignee: Kronos Titan-G.m.b.H., Fed. Rep. of Germany

[21] Appl. No.: 289,441

[22] Filed: Aug. 3, 1981

[30] Foreign Application Priority Data

Aug. 13, 1980 [DE] Fed. Rep. of Germany ....... 3030558

[51] Int. Cl.$^3$ ............................................. C02F 11/14
[52] U.S. Cl. ..................................... 210/726; 210/738; 210/788; 210/199; 210/201
[58] Field of Search ............... 210/724, 726, 788, 199, 210/201, 205, 252, 512.1, 512.2, 609, 738

[56] References Cited

U.S. PATENT DOCUMENTS

| 660,214 | 10/1900 | Gathmann | 210/788 |
|---|---|---|---|
| 4,017,388 | 4/1977 | Albertson | 210/724 X |
| 4,017,390 | 4/1977 | Vicard | 210/788 X |
| 4,110,212 | 8/1978 | Krofchak | 210/726 X |

Primary Examiner—Thomas G. Wyse
Attorney, Agent, or Firm—Burns, Doane, Swecker and Mathis

[57] ABSTRACT

The invention provides an apparatus for the conditioning of sludges comprising two vertically arranged cylindrical vessels. An overflow pipe connecting the two cylindrical vessels is installed tangentially to the upper portions of the cylindrical vessels and may be provided with a detachable coupling. A sludge feed pipe is connected to the first cylindrical vessel and is installed in a direction tangentially opposite the overflow pipe above the bottom of the first vessel. A feed tube is installed tangentially into the sludge feed pipe. Two additional feed tubes are installed tangentially into the overflow pipe. A discharge pipe is installed in a direction tangentially opposite the overflow pipe above the bottom of the second vessel.

24 Claims, 2 Drawing Figures

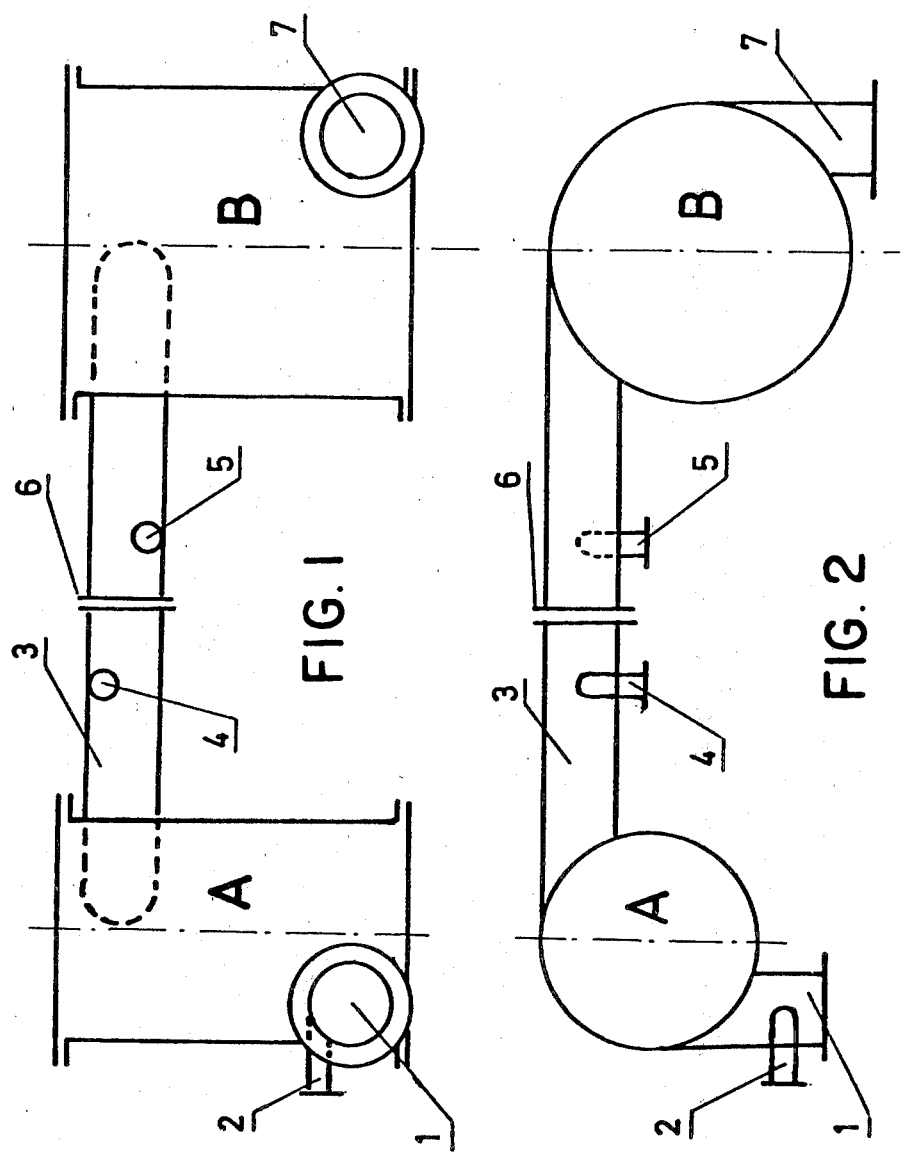

APPARATUS FOR THE CHEMICAL CONDITIONING OF SLUDGES

This invention is concerned with an apparatus for the chemical conditioning of sludges.

The quantity of raw sludges occurring in sewage treatment works shows a rising trend. The sludges are mostly derived from municipal waste water and industrial effluents.

The usual raw sludges have a high water content; their dry solids content averages 2 to 10% by weight and mostly ranges between 4 and 6% by weight. Therefore, they have to be dewatered prior to being discarded.

The conventional natural sludge dewatering by way of depositing on large drying beds, storage fields, etc. has largely been replaced by mechanical sludge dewatering. Mechanical sludge dewatering primarily uses static dewatering processes, such as filtration in filter presses (yielding high dry solids content and low-solids filtrates) or in belt filter presses or rotary filters. Dynamic processes, such as separation of water by centrifugal forces in decanting centrifuges or hydrocyclones, are also employed but with substantially less frequency.

Depending on their origin, sludges are rather different in their composition and physico-chemical structure. Their physico-chemical structure may vary from heterogeneous colloidal to coarse disperse systems.

Depending on type and percentage of primary sludge (pre-clarification sludge) and secondary sludge (excess sludge from activation) and depending on the degree of anaerobic and aerobic stabilization and the content of industrial sludge, the composition and water take up capacity of a sludge may vary as may the quantities of interspace water, adhesion water, capillary water and internal water of the sludge.

Mechanical sludge dewatering is a central process step in sludge treatment with the objectives of the highest possible dehydration in order to reduce the volume of the sludge to be processed, improve sludge consistency and reduce energy costs in sludge incineration or transportation and dumping costs.

Generally, mechanical sludge dewatering processes aim to concentrate sludges of a dry solids content of about 5% by weight to between 35 and 50% by weight with relatively short sludge compression times.

It is necessary to condition the sludge for dewatering, i.e., to subject it to a thermal or chemical treatment by which its colloidal state is broken and it begins to flocculate and the sludge suspension is converted to a filterable state. Without prior conditioning it is not possible to dewater the sludge obtained in sewage works.

The optimum conditions of conditioning have to be determined by trials for each individual case and should be chosen in such a way that in the subsequent sludge dewatering, e.g. with a filter press, a compact, homogeneously moistened filter cake is obtained that has a dry solids content of at least 35% by weight and can be easily removed from the corrugations of the filter plates after a relatively short compression time.

Sludge conditioning plants usually consist of a mixing vessel of 1 to 5 m³ capacity and are equipped with agitators and the necessary feed lines for additives.

Conditioning agents for sludges mostly are inorganic flocculants (sometimes also called coagulants) such as the chlorides and sulfates of aluminium and iron these are used virtually always in combination with a neutralizing agent (preferably hydrated lime).

Usually the flocculant is added to the sludge first and then the neutralizing agent. If necessary, high molecular organic flocculating aids such as polyacrylamides may also be used. It is supposed that the inorganic flocculant added first breaks the colloidal state of the sludge to induce a primary flocculation. The hydrated lime suspension added next increases the pH of the sludge, increases the floc size and later serves as a support in the filter cake.

When iron (III) chloride sulfate ($FeClSO_4$) is used, which is a highly efficient flocculant in waste water clarification and water treatment, conditioning may involve technical difficulties with certain sludges in that subsequent pressure filtration, e.g. in a chamber filter press, produces soft filter cakes, i.e. a cake with too low a dry solids content (H. G. Klostermann: Berichte der Abwassertechnischen Vereinigung e.V. (1979), No. 31, pp 173 to 180).

The one-step conditioning facilities commonly used in sludge dewatering plants were found in most cases to be unsuitable for the use of iron (III) chloride sulfate. This is probably because the density and viscosity of the commercial concentrated aqueous solution of $FeClSO_4$ are so different from the density and viscosity of the sludge that both substances only mix slowly. As a result, and depending on the design of the facilities, sludge and iron (III) chloride sulfate solution are not completely mixed with each other when the neutralizing agent is added. Frequently a satisfactory blending is not even achieved if the iron (III) chloride sulfate solution is fed into the raw sludge pipe before the sludge is charged into the mixer. Moreover, the agitators installed in most of the conventional plants impair the subsequent growth of the flocs.

The purpose of this invention is to provide an apparatus for the chemical conditioning of sludges particularly for the use of iron (III) chloride sulfate as a flocculant.

According to the present invention there is provided an apparatus for the conditioning of sludge comprising:
  a. two vertically arranged cylindrical vessels;
  b. an overflow pipe connecting the two cylindrical vessels installed tangentially to the upper portions of the cylindrical vessels;
  c. a sludge feed pipe installed in a direction tangentially opposite the overflow pipe above the bottom of the first vessel;
  d. a feed tube installed tangentially into the sludge feed pipe; and
  e. two further feed tubes installed tangentially into the overflow pipe; and
  f. a discharge pipe installed in a direction tangentially opposite the overflow pipe above the bottom of the second vessel.

In another embodiment of the invention there is provided an apparatus for the conditioning of sludge comprising: two cylindrical vessels arranged one behind the other whose upper parts are connected with each other by an overflow pipe that is installed tangentially to the upper cylinder areas of the vessels and is provided with a detachable connection, a sludge feed pipe being installed above the bottom of the first vessel tangentially to its cylinder area and a feed tube for a solution or suspension of a flocculant being installed tangentially to the sludge feed pipe, two further tubes opening tangentially into the overflow pipe between the vessels, through which tubes a suspension and/or a solution of a neutralizing agent or suspension of a flocculating aid can be introduced, and a discharge pipe for the conditioned sludge being installed above the bottom of the second vessel tangentially to its cylinder area.

The appartus as invented (conditioning mixer) is presented in FIGS. 1 and 2 in side view and top view.

The capacities of the vessels generally depend on the throughput of the sludge pump and on the quantity of agents added. The capacity of the second vessel is preferably larger than that of the first vessel as the stream of liquid in the second vessel is greater than in the first one. The capacity of the first vessel for instance may be 20 L. and that of the second vessel 28 L., and the ratio of internal height:inner diameter of both vessels may be between 1.4 and 2.1 to 1.

The apparatus has the design advantage that the feed tubes for the solution or suspension of the flocculant, the neutralizing agent and/or the flocculating aid can be equipped with inserts of different diameters. It is thus possible to keep the flow rate of the respective additives virtually constant with different sludge throughputs. The apparatus may be supplemented, by installation of a unit for pH control.

The sludge to be conditioned is charged into the lower part of vessel A through the sludge feed pipe 1 installed above the bottom of vessel A tangentially to its cylinder area. A feed tube 2 is installed tangentially to the sludge feed pipe 1, through which a solution or suspension of a flocculant is introduced into the sludge. Both liquid streams are conveyed upward in a spiral flow in vessel A while they intensively mix with each other. Two further feed tubes 4 and 5 open tangentially into the overflow pipe 3 which connects the upper portions of vessels A and B tangentially. Through these tubes a solution or suspension of a neutralizing agent and/or a solution or suspension of a flocculating aid can be introduced and mixed with the sludge before the latter, via the overflow pipe 3 equipped with a detachable connection 6, e.g., a flange connection, enters tangentially vessel B where it is conveyed downward in a spiral flow in which the ingredients further mix intensively, and leaves vessel B through discharge pipe 7 in the form of a homogeneous conditioned sludge.

As described above, the flocculant is usually introduced through feed tube 2, whereas the neutralizing agent is fed into the sludge through tube 4 or 5. But, the agents may also be fed conversely, i.e., the neutralizing agent being introduced through tube 2 and the flocculant being fed through tube 4 or 5.

Compared with conventional apparatus, the apparatus as invented is substantially smaller, easier to build, requires less material in construction and needs no agitator. It is easily moved and assembled.

The apparatus as invented can be used universally for the conditioning of virtually all sludges with any flocculant. In particular, it renders entire sludge processing more economical as the sludges thus conditioned can be transferred immediately to the filter press and give filter cakes of high dry solids content after only short compression times.

The apparatus of the present invention is particularly suitable for the use of iron (III) chloride sulfate flocculant. The latter may be used as an aqueous solution having a concentration between 30 and 45% by weight $FeClSO_4$. Depending on the type of sludge, it may be advantageous to dilute the iron (III) chloride sulfate solution with water to a concentration between 10 and 35% by weight, preferably between 20 and 30% by weight prior to feeding it to the sludge. The dilution can take place continuously in a premixer. This procedure reduces the differences in density and viscosity between iron (III) chloride sulfate solution and sludge and accelerates mixing of both substances with each other. After the flocculant, hydrated lime neutralizing agent is added to the sludge, e.g., in the form of a suspension of a concentration between 7 and 15% by weight, preferably 10% by weight $Ca(OH)_2$. The pH may then be adjusted to between 10 and 12.5 in order that macroflocs may form.

It is essential that the blending of iron (III) chloride sulfate and hydrated lime with the sludge is intensive and takes place within the shortest possible dwell time in the mixing apparatus without the use of auxiliary instruments. Use of auxiliary equipment, e.g., agitators would impair the growth of flocs due to a substantially longer mechanical stress. The mixing in the inventive apparatus is achieved by the tangential introduction of all components into the mixing apparatus, producing spiral streams which warrant rapid and thorough mixing without imparting undue stress which would impair the growth of flocs.

The mean dwell time of the sludge, calculated from its being charged into vessel A until its being discharged from vessel B should be between 4 and 10 sec, preferably 6 to 8 sec. With a pump throughput of 20 $m^3/h$ or raw sludge and a dosage of 3.8 $m^3/h$ of a 10% by weight hydrated lime suspension, the dwell time is for instance about 7.8 sec. The sludge is already thoroughly mixed when leaving vessel A, that means after 3.6 sec.

In order to achieve optimum conditioning, the flow rate of the solution or suspension of the flocculant on being fed into the sludge and the flow rate of the sludge in the feed pipe to vessel A, in the overflow pipe between vessels A and B and in the discharge pipe between vessels A and B and in the discharge pipe vessel B as well as in vessels A and B proper, should range within certain limits. The flow rate of the iron (III) chloride sulfate solution on being introduced into the sludge for instance should range between 1 and 10 m/sec, preferably between 2 and 5 m/sec. The flow rate of the sludge in the feed pipe to vessel A, in the overflow pipe between the two vessels A and B and in the discharge pipe from the second vessel B should range between 1 and 3 m/sec, preferably between 1.3 and 2.5 m/sec. The flow rate of the sludge in vessels A and B in the particular should be less than 0.3 m/sec, preferably between 0.08 and 0.2 m/sec, related to the internal cross section. If the rate of 0.3 m/sec is exceeded, excessively high shear forces will develop so that the growth of the flocs is imparied and difficult-to-filter sludges are produced.

Use of the apparatus as invented allows the further treatment of the conditioned sludge immediately after leaving the mixing device, e.g., in a chamber filter press. The speedy operation prevents the formation of deposits, e.g., gypsum, which occasionally occurs in conventional mixers when sulfate-containing flocculants are used. These deposits cause clogging of the filter cloth and hence disturb the compression procedure.

Use of the apparatus as invented for the conditioning of sludges together with the addition of iron (III) chloride sulfate offers the following advantages compared with conditioning in a conventional mixer irrespective of whether the flocculants being used are iron (III) chloride or iron (III) chloride sulfate: lower specific consumption of iron salt (calculated as Fe), lower consumption of Ca(OH)₂ (both calculated on m³ of sludge treated), substantially shorter dwell time in the mixing device, shorter compression time in the filter press and higher dry solids content of the filter cake.

The invention is explained in more detail by the following examples.

EXAMPLE 1

A raw sludge (digested sewage sludge containing 20% of secondary sludge) with a dry solids content of 4.4% by weight was pumped, by means of the sludge pump, in a stream of 25.0 m³/h through sludge feed pipe 1 into vessel A having a capacity of 20 L. Through feed tube 2 whose outlet was narrowed to an inner diameter of 6 mm, 229 L/h of an aqueous iron (III) chloride sulfate solution was conveyed into the sludge stream, the concentration of said aqueous solution being 21.1% by weight FeClSO₄ (=256 g FeClSO₄/L), which corresponds to a dosage of 9.16 L FeClSO₄ solution (21.1% by weight) per m³ of sludge. Having passed through vessel A into overflow pipe 3, this mixture was fed with 3.7 m³/h of an aqueous suspension of hydrated lime of a concentration of 10% by weight Ca(OH)₂ via feed tube 4 into vessel B. The consumption of hydrated lime, expressed as Ca(OH)₂, was 14.8 kg/m³ of sludge and the pH of the conditioned sludge was 12.2. The conditioned sludge then passed through vessel B having a capacity of 28 L and was discharged through pipe 7 after a dwell time in the mixing apparatus of althogether 6.3 sec.

In the subsequent compression in a chamber filter press with compression times of 55 min (several trials), easily removable solid press cakes of dry solids contents between 39 and 43% by weight were obtained which could be easily handled, i.e., stacked, conveyed and dumped.

The flow rate of the iron (III) chloride sulfate solution on being fed into the sludge was 2.2 m/sec; the flow rate of the sludge in the feed pipe to vessel A was 1.4 m/sec, in the overflow pipe between vessels A and B (after addition of hydrated lime suspension and in the discharge pipe from vessel B, 1.6 m/sec. The flow rate of the sludge in vessel A was 0.14 m/sec and in vessel B, 0.11 m/sec. In both cases the flow rate was related to the inner cross section of the vessels.

EXAMPLE 2

(Comparative example using a conventional conditioning mixer.) In a conventional mixer equipped with a stirrer vessel, raw sludge of the same composition as in sample 1 was treated, at a pump throughput of 17 m³/h of sludge, with 245 L/h of an iron (III) chloride sulfate solution of a concentration of 26.2% by weight FeClSO₄ (=336 g FeClSO₄) corresponding to a dosage of 14.4 L FeClSO₄ solution (26.2% by weight) per m³ of sludge.

From this, the specific consumption of FeClSO₄, expressed as Fe, was calculated to be 1.44 kg Fe/m³ of sludge.

Furthermore, an aqueous suspension of hydrated lime of a concentration of 10% by weight Ca(OH)₂, the quantity being 3.7 M³/h, which corresponds to an addition of 21.8 kg Ca(OH)hd 2/m³ of sludge, was fed into the sludge 500 mm downstream of the feed point of the FeClSO₄ solution. After this, the pH of the conditioned sludge was 12.3 and the dwell time of the sludge in the conventional mixing apparatus during conditioning was 11.5 min.

After compression times between 90 and 120 min (several trials) press cakes of lower solidity than in example 1 were obtained; the cakes partly stuck to the filter cloths, their dry solids content was only about 33% by weight and they were difficult to handle.

EXAMPLE 3

(Comparative example using iron (III) chloride solution.) In the conventional apparatus as used in example 2, raw sludge of the same composition as in examples 1 and 2 was treated, at a pump throughput of 18 m³/h of sludge, with 90 L/h of an iron (III) chloride solution of a concentration of 40.5% by weight FeCl₃ (=580 g FeCl₃/L), corresponding to a dosage of 5.0 L FeCl₃ solution (40.5% by weight) per m³ of sludge. From this, the specific consumption of FeCl₃, expressed as Fe, was calculated to be 1.0 kg Fe/m³ of sludge.

Furthermore, an aqueous suspension of hydrated lime of a concentration of 10% by weight Ca(OH)₂, the quantity being 3.7 m³/h, which corresponds to an addition of 20.6 kg Ca(OH)₂/m³ of sludge, was fed into the sludge 500 mm downstream of the feed point of FeCl₃ solution. After this, the pH of the conditioned sludge was 12.3 and the dwell time of the sludge in the conventional mixing apparatus during conditioning was 11.0 min.

After compression times of 90 min (several trials), solid press cakes were obtained which could be easily removed and were easy to handle. Their dry solids contents were between 35 and 40% by weight.

The invention being thus described, it will be obvious that the same may be varied in many ways, such variations are not to be regarded as a departure from the spirit and scope of the invention, and all such modifications are intended to be within the scope of the following claims.

We claim:

1. An apparatus for the conditioning of sludges comprising:
   a. first and second vertically arranged cylindrical vessels, each vessel having a sealed bottom and a sealed top;
   b. an overflow pipe connecting the first and second cylindrical vessels installed tangentially to the upper portions of the first and second cylindrical vessels;
   c. a sludge feed pipe connected to a source of sludge, said sludge feed pipe being installed in a direction tangentially opposite the overflow pipe above the bottom of the first vessel;
   d. a feed tube connected to a source of a first conditioning material, said feed tube being installed tangentially into the sludge feed pipe;
   e. two further feed tubes being respectively connected to sources of a second and a third treating material, said two further feed tubes being installed tangentially into the overflow pipe; and
   f. a discharge pipe installed in a direction tangentially opposite the overflow pipe above the bottom of the second vessel, said apparatus being further constructed and arranged whereby the sludge entering the sludge feed pipe is mixed with the first conditioning material, spirals upward through the first vessel, passes through the overflow pipe wherein it is mixed with the second and third conditioning material, passes into the second vessel, spirals downward thereby further mixing the sludge and the conditioning materials and is discharged through the discharge pipe.

2. The apparatus of claim 1 wherein the overflow pipe is provided with a detachable coupling.

3. The apparatus of claim 1 wherein the capacity of the second vessel is larger than that of the first vessel.

4. The apparatus of claim 4 wherein the three feed tubes can be equipped with inserts of different diameters.

5. The apparatus of claim 1 wherein the ratio of internal height to internal diameter of the first and second cylindrical vessels is between 1.4 and 2.1 to 1.

6. A process for the conditioning of sludge comprising:
   a. feeding sludge to the lower part of a first vertically arranged cylindrical vessel having a sealed bottom and a sealed top;
   b. treating the sludge by the addition of a flocculant;
   c. mixing the sludge and flocculant in an intensive manner by conveying the sludge and flocculant in a spiral flow upward through the first vessel to form a sludge mixture;
   d. transferring the sludge mixture to the upper part of a second vertically arranged cylindrical vessel having a sealed bottom and a sealed top;
   e. adjusting the pH of the sludge mixture by the addition of a fluid neutralizing agent;
   f. mixing the sludge mixture and neutralizing agent in an intensive manner by conveying the sludge mixture and neutralizing agent in a spiral flow downward through said second vessel to form a homogeneous conditioned sludge; and
   g. recovering the conditioned sludge.

7. The process of claim 6 wherein the flocculant is iron (III) chloride sulfate.

8. The process of claim 6 wherein the fluid neutralizing agent is an aqueous suspension of hydrated lime.

9. The process of claim 6 wherein the flocculant is an aqueous solution of iron (III) chloride sulfate containing between 10 and 45% by weight iron (III) chloride sulfate.

10. The process of claim 6 wherein the sludge is adjusted to a pH between 10 and 12.5 after the addition of the iron (III) chloride sulfate.

11. The process of claim 6 wherein the mean sludge retention time within the cylindrical vessels is between 4 and 10 seconds.

12. The process of claim 6 wherein the flow rate of iron (III) chloride sulfate flocculant solution on being fed to the sludge is between 1 and 10 m/sec.

13. The process of claim 6 wherein the flow rate of sludge into the first vessel, on transfer to the second vessel, and upon recovery from the second vessel is between 1 and 3 m/sec.

14. The process of claim 6 wherein the flow rate in the first and second vessels related to their internal cross-section is between 0.08 and 0.2 m/sec.

15. A process for the conditioning of sludge comprising:
   a. feeding sludge to the lower part of a first vertically arranged cylindrical vessel having a sealed bottom and a sealed top;
   b. adjusting the pH of the sludge mixture by the addition of a fluid neutralizing agent;
   c. mixing the sludge and neutralizing agent in an intensive manner by conveying the sludge mixture of neutralizing agent spirally upward through the first vessel to form a sludge mixture;
   d. treating the sludge mixture by the addition of a flocculant;
   e. transferring the sludge mixture to the upper part of a second vertically arranged cylindrical vessel having a sealed bottom and a sealed top;
   f. mixing the sludge mixture and flocculant spirally downward through said second vessel to form a homogeneous conditioned sludge; and
   g. recovering the conditioned sludge.

16. The process of claim 15 wherein the flocculant is iron (III) chloride sulfate.

17. The process of claim 15 wherein the fluid neutralizing agent is an aqueous suspension of hydrated lime.

18. The process of claim 15 wherein the flocculant is an aqueous solution of iron (III) chloride sulfate containing between 10 and 45% by weight iron (III) chloride sulfate.

19. The process of claim 15 wherein the sludge is adjusted to a pH between 10 and 12.5 after the addition of the iron (III) chloride sulfate.

20. The process of claim 15 wherein the mean sludge retention time within the cylindrical vessels is between 4 and 10 seconds.

21. The process of claim 15 wherein the flow rate of iron (III) chloride sulfate flocculant solution on being fed to the sludge is between 1 and 10 m/sec.

22. The process of claim 15 wherein the flow rate of sludge into the first vessel, on transfer to the second vessel, and upon recovery from the second vessel is between 1 and 3 m/sec.

23. The process of claim 15 wherein the flow rate in the first and second vessels related to their internal cross-section is between 0.08 and 0.2 m/sec.

24. A process for the conditioning of sludge comprising:
   a. feeding sludge to the lower part of a first vertically arranged cylindrical vessel having a sealed bottom and a sealed top;
   b. treating the sludge by the addition of an aqueous solution of iron (III) chloride sulfate containing between 20 and 30% by weight;
   c. mixing the sludge and flocculant in an intensive manner by conveying the sludge and flocculant in a spiral flow upward through the vessel to form a sludge mixture;
   d. transferring the sludge mixture to the upper part of a second vertically arranged cylindrical vessel having a sealed bottom and a sealed top;
   e. adjusting the pH of the sludge mixture to between 10 and 12.5 by the addition of a suspension hydrated lime;
   f. mixing the sludge mixture and suspension of hydrated lime in an intensive manner by conveying the sludge mixture and suspension of hydrated lime in a spiral flow downward through said second vessel to form a homogenous conditioned sludge; and
   g. recovering the conditioned sludge.

* * * * *